United States Patent [19]

Luetzelschwab

[11] Patent Number: 4,576,978

[45] Date of Patent: * Mar. 18, 1986

[54] METHOD FOR PREPARING POLYMER SOLUTIONS

[75] Inventor: Wayne E. Luetzelschwab, Littleton, Colo.

[73] Assignee: Marathon Oil Company, Findlay, Ohio

[ * ] Notice: The portion of the term of this patent subsequent to Apr. 2, 2002 has been disclaimed.

[21] Appl. No.: 699,759

[22] Filed: Feb. 8, 1985

Related U.S. Application Data

[63] Continuation-in-part of Ser. No. 466,737, Feb. 16, 1983, Pat. No. 4,508,858.

[51] Int. Cl.$^4$ ............................................. C08L 33/26
[52] U.S. Cl. ................... 523/313; 523/318; 523/348; 524/827; 525/329.4
[58] Field of Search ............... 523/313, 318, 348; 524/555, 827; 525/329.4

[56] References Cited

U.S. PATENT DOCUMENTS

| | | | |
|---|---|---|---|
| 2,820,777 | 1/1958 | Suen et al. | 526/229 |
| 4,021,394 | 5/1977 | Tuka et al. | 523/348 |
| 4,110,521 | 8/1978 | Barnett et al. | 526/295 |
| 4,508,858 | 4/1985 | Luetzelschwab | 523/313 |

*Primary Examiner*—Joseph L. Schofer
*Assistant Examiner*—N. Sarofim
*Attorney, Agent, or Firm*—Jack L. Hummel; Rodney F. Brown

[57] ABSTRACT

A method for the on-site continuous preparation of aqueous solutions of polymers, especially aqueous solutions of partially hydrolyzed polyacrylamides, for use in secondary and tertiary oil recovery processes. The method utilizes an apparatus comprised of a polymerization reactor and a post polymerization reactor. Successive batches of an initiated reaction mixture are sequentially fed into the polymerization reactor in discrete volumes. The volumes are moved through the polymerization reactor at a rate such that when a volume reaches the outlet of the polymerization reactor, the reaction will have gone to substantial completion. The resulting polymer solution is withdrawn from the polymerization reactor and continuously conveyed to the post polymerization reactor. Enroute dilution water and a polymer modifying agent are continuously introduced into the polymer solution to form a second reaction mixture. The second reaction mixture is continuously moved through the post polymerization reactor at a flow rate such that the reaction will be substantially complete when the mixture reaches the reactor outlet.

18 Claims, 1 Drawing Figure

METHOD FOR PREPARING POLYMER SOLUTIONS

This is a continuation-in-part application of copending patent application Ser. No. 466,737 filed on Feb. 16, 1983, now U.S. Pat. No. 4,508,858.

BACKGROUND OF THE INVENTION

1. Field of the Invention

The present invention relates to a method for preparing polymer solutions and in particular to a method for preparation of aqueous polymer solutions of the type used in secondary and tertiary oil recovery processes.

2. Description of Related Art

Various apparatus and methods for preparing aqueous polymer solutions, including aqueous solutions of partially hydrolyzed polyacrylamides, have been proposed. U.S. Pat. No. 2,820,777 discloses a one-step batch method for simultaneously polymerizing and hydrolyzing acrylamide monomer in a single reaction vessel. Two solutions are pumped at an equal volume rate into the reactor. The first solution comprises acrylamide monomer and water and the other comprises a polymerization catalyst, an alkali metal hydroxide, and water. Although the properties of the polymer product may be a function of the proportional amount of reactants and the reaction conditions, as the patent suggests, it is virtually impossible to predictably produce a specific polymer using this batch method because of inherent process control difficulties. Therefore, the method is unsuitable for preparing aqueous polymer solutions used in secondary and tertiary oil recovery processes. Such processes requires polymers having predictable properties to meet the performance demands of an oil-bearing formation.

U.S. Pat. No. 4,110,521 is directed to a method for the continuous preparation of aqueous polymer solutions. The method is relatively complex and costly because it requires a large number of static mixers, pumps and temperature controls. As a result, it is impractical and unsuitable for on-site preparation of aqueous polymer solutions used in secondary and tertiary oil recovery processes.

SUMMARY OF THE INVENTION

The method of the present invention is uniquely suited for the on-site continuous preparation of aqueous polymer solutions, which are used as drive fluids and/or mobility control buffers in secondary or tertiary oil recovery processes. The apparatus used in the present method is inexpensive and easy to build and operate. The present method of preparing the polymer solution provides easy handling of the process streams and enables one to closely monitor every stage of the process, thereby producing a polymer having maximum effectiveness in meeting the performance demands of substantially any oil-bearing formation.

In the method of the present invention, a discrete volume or slug of a reaction mixture comprising an aqueous solution of a monomer and a polymerization initiator or catalyst is formed in a reaction mixture receiving means. The volume of reaction mixture is desirably maintained in the receiving means for a time sufficient to initiate polymerization. The volume of partially polymerized solution is then conveyed into a polymerization reactor means having inlet and outlet means. The volume of partially polymerized solution is passed through the polymerization reactor means at a rate such that when the volume of solution reaches the polymerization reactor outlet, it is essentially completely polymerized.

The completely polymerized solution is then conveyed from the polymerization reactor means to a post polymerization reactor means having inlet and outlet means. Enroute to the post polymerization reactor means dilution water and one or more polymer modifying agents, such as a hydrolyzing agent, are added to and entrained in the completely polymerized solution stream. The resulting dilute polymer solution, containing the modifying agent, is passed through the post polymerization reactor means at a rate to enable the modifying agent to completely convert the polymer to a desired form. From the post polymerization reactor means, the converted polymer solution is transferred to a location where it may be further treated. Such treatment usually comprises the addition of more water to obtain the ultimate desired dilution of the polymer solution for its specific use.

The above-recited series of steps are repeated several times to establish reaction gradients in both the polymerization reactor means and the post polymerization reactor means and to provide a continuous flow of aqueous polymer solution from the process. In the polymerization reactor means, the reaction gradient is represented by a plurality of discrete volumes of slugs of partially polymerized solution descending through the reactor means. The extent to which the polymerization reaction has progressed is uniformed within each volume, but differs from volume to volume within the entire polymerization reactor means. There is no mixing between the volumes. Thus, the extent of reaction in a given volume in the reactor is greater than that of a volume entering the reactor after it, but less than that of a volume which has entered the reactor before it.

While the reaction gradient in the post polymerization reactor means is not as well defined as that in the polymerization reactor means, the extent of reaction is also a function of reactor location. Like the polymerization reactor means, the post polymerization reactor means is characterized in that the reaction will be just starting or progressing to only a minor extent at the inlet end of the reactor means, while the reaction will be progressing significantly toward completion in the region between the inlet and outlet ends of the reactor means. The reaction will be essentially complete at the outlet end of the reactor means. The progress of the reactions occurring in each of the reactor means can be monitored and the flow rates of the process streams can be readily controlled to assure that the end product from each reactor means has the desired properties.

The foregoing and other features and advantages of the invention will become apparent from the description to follow, taken in conjunction with the accompanying drawing.

DESCRIPTION OF THE PREFERRED EMBODIMENTS

Figure 1:
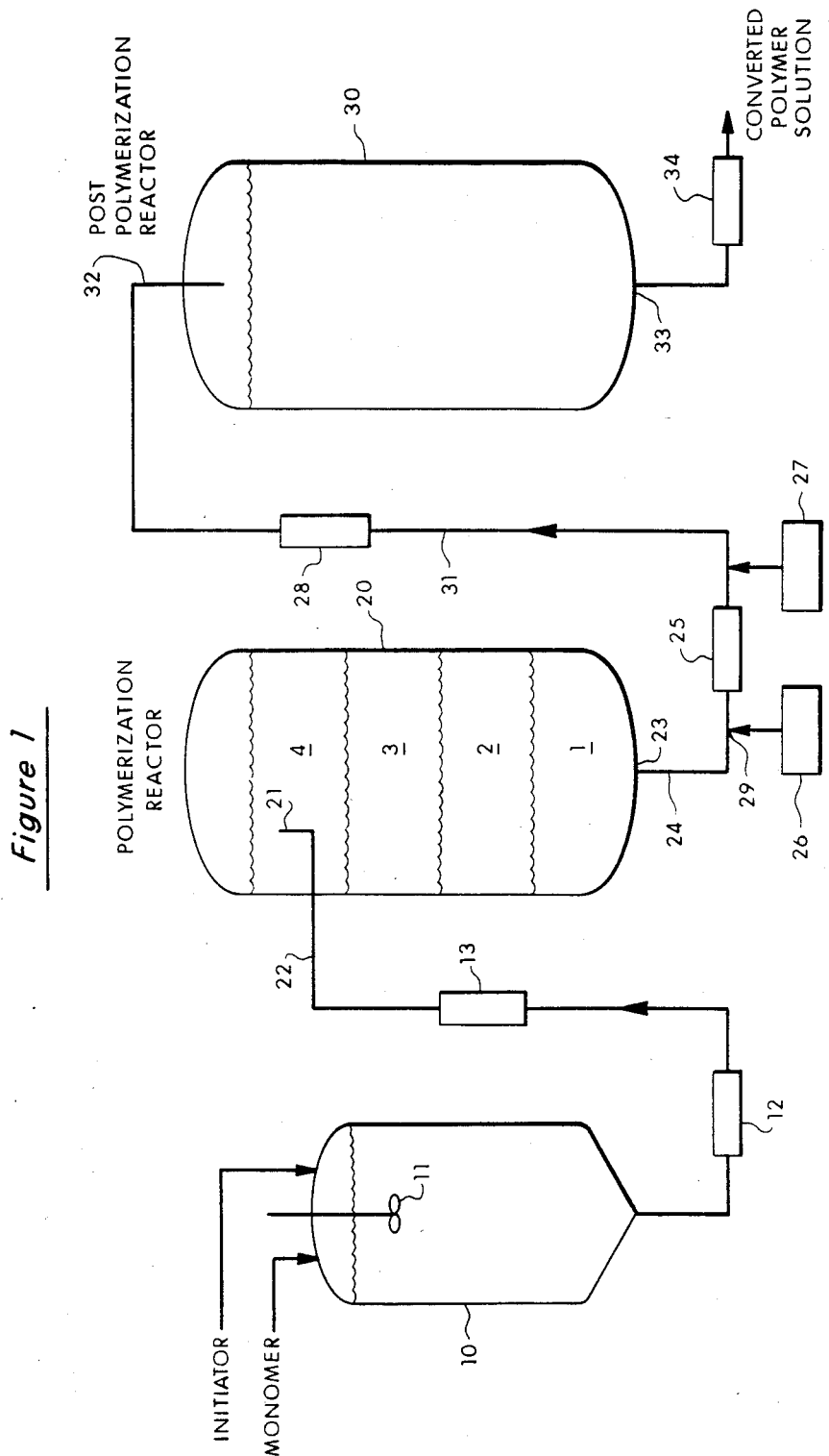
FIG. 1 is a schematic representation of the present invention.

To illustrate the method for preparing an aqueous solution of a partially hydrolyzed polyacrylamide of the type employed in secondary and tertiary oil recovery, specific reference is made to FIG. 1. For purposes of this illustration, the reaction mixture receiving vessel 10 has a capacity of approximately 5000 gallons. The reactors 20 and 30 each have a capacity of about 100,000 gallons. An aqueous monomer solution, comprising about 6% by weight acrylamide monomer, and a polymerization initiator are fed to the vessel 10. The vessel 10 desirably is sparged with nitrogen either before or after addition of the initiator to remove any oxygen therefrom.

A preferred initiator is a cocatalyst system comprising sodium bisulfite and ammonium persulfate. The sodium bisulfite is introduced into the vessel 62 first as an oxygen scavenger. Then ammonium persulfate is added. The concentration of the catalysts is about 180 ppm of the bisulfite and about 400 ppm of the persulfate based on the weight of monomer.

The resulting reaction mixture is stirred in the vessel 10 by stirrer 11, initiating polymerization. The reaction temperature ranges from about 100° F. to about 110° F. The residence time of the reaction mixture in the vessel 10 need only be long enough to insure initiation of the reaction, which is indicated by a slight rise in the temperature of the vessel 10. Generally the residence time in the vessel 10 is about 0.5 hours, although shorter times are possible and under some circumstances longer times may be necessary to initiate polymerization. Residence times in the vessel can be extended without unduly extending the time interval between feeds to the reactor 20 simply by using two or more vessels similar to vessel 10 operating in series. The partially polymerized solution is transferred at a rate of about 100 gallons per minute from vessel 10 by pump 12 to the polymerization reactor 20 via inlet 22. Although not essential, the solution may be passed through a heat exchanger 13 prior to entering the polymerization reactor 20, thereby lowering the temperature of the reaction mixture as it enters the reactor 20 to about 90° F. Reactor 20 may also be sparged with nitrogen to remove any remaining oxygen.

After the vessel 10 has been emptied, a fresh volume of aqueous monomer solution and initiator is again introduced into the vessel 10 and processed in the same manner as above. The resulting volume of partially polymerized solution is then conveyed to the reactor 20 and added to its contents. The procedure is repeated until several volumes of partially polymerized solution are present in the reactor 20.

The volumes are conceptually illustrated in FIG. 1 by reference characters 1, 2, 3 and 4. Although for purposes of illustration, the reactor as shown contains only four volumes of solution having parallel horizontal interfaces, in practice, the reactor may contain many more volumes. Also internal effects such as laminar flow can distort the parallel interfaces between the volumes to irregular shapes. However, each volume maintains a distinct interface between adjacent volumes and substantially no mixing occurs between the volumes throughout their residence times in the reactor 76. These effects are achieved by sequentially adding the volumes to the reactor. The volumes of partially polymerized solutions are too viscous to mix simply by gravity and diffusion between volumes is insignificant during the residence times of interest.

The feed to the reactor 20 is performed in a manner which tends to distribute the volume across the internal cross-sectional area of the reactor 20. The viscosity of each volume of solution is such that this may be accomplished to some extent merely by discharging a volume from a single inlet orifice directed downward from the top of the reactor onto a volume of solution already present in the reactor. Distributors, such as a perforated plate or a plurality of perforated or slotted arms extending radially from a central inlet, can also be employed to provide greater distribution. The preferred method of feeding the partially polymerized solution to the reactor 76 is shown in FIG. 1 wherein the inlet line 22 is inserted into the sidewall of the reactor 20 and has an orifice 21 directed upward near the top of the tank which effectively distributes the incoming volume across the preceding one, minimizes penetration of the incoming volume into the preceding volume, and promotes the formation of a stable interface between the volumes. The preferred embodiment also avoids plugging problems which may occur in the other distributors listed above, having constricted flow paths.

Each volume has a minimum residence time in the reactor 20 of from about 20 to about 30 hours and preferably about 25 hours. As noted above, each volume in the reactor 20 has a different degree of polymerization at any given instant. For example volume 2 in the reactor 20 of FIG. 1 is polymerized to a greater extent than volume 4 at any given instant. The height and flow rate of the reactor 20 are determined such that the polymerization reaction has gone substantially to completion in volume 1 when it reaches the reactor outlet 23. At that point volume 1 is withdrawn from the reactor 20 via conduit 24 under the power of pump 25 at a flow rate of about 55 gallons per minute.

After withdrawing the completely polymerized solution from the reactor 20 and before it enters the post polymerization reactor 30, the solution is diluted with water under continuous flow conditions from a source 26. Within this constraint, the exact point of water addition is not critical. A hydrolyzing agent from a source 27 is also added to the solution before it enters the post polymerization reactor 30. In a preferred method, the dilution water is added to the polymer solution upstream of a static mixer 28 which is located in line 31 downstream of the point where the hydrolyzing agent is added to the solution, but upstream of the post polymerization reactor 30. The static mixer 28 is used to ensure complete contacting of the polymer and hydrolyzing agent. Alternatively, the water may be added to the polymer solution at an intermediate point in the static mixer.

Dilution of the polymer solution with water prior to or during static mixing reduces the pressure drop across the static mixer and provides ease in handling of the solution in the post polymerization reactor and any subsequent treatment without any substantial deleterious effects to the hydrolysis reaction. Furthermore the dilution at this point enables one to prepare polymer solutions of greater concentration in reactor 20 than could otherwise be prepared due to pumping limitations. In the most preferred method, water is added to the polymer solution at point 29 upstream of the pump 25. In addition to the above-recited advantages, dilution at a point before the pump suction substantially reduces the load on pump 25.

As much dilution water may be added to the polymer solution as desired up to the maximum which is the point where a free water phase separates from the viscous bulk phase after passing through the static mixer. "Free water" as defined herein is a very thin aqueous phase which is considerably less viscous than the bulk phase of the polymer solution. The maximum amount of water which may be added to the polymer solution is a function of the polymer concentration in the solution and the configuration of the static mixer. The actual volume of water added to the polymer solution is expressed as the fraction:

$$\frac{\text{polymer solution}}{\text{polymer solution + dilution water}}$$

wherein "polymer solution" is the volume of polymer solution before dilution and "dilution water" is the volume of dilution water which is added to the polymer solution. Generally the minimum value of the fraction is about 0.5 for a 9% by weight polymer solution. However, in usual operation the fraction is maintained around 0.67 to insure that no free water separates from the solution. Any water may be added, which is compatible with the hydrolyzing agent, i.e., does not contain constituents which react with the hydrolyzing agent. The preferred dilution water is fresh water. If a brine is to be used in the ultimate on-site dilution of the polymer solution, a salt, such as NaCl, may be added to the dilution water of the present invention to improve the solubility of the dilute polymer solution in the brine.

The amount of hydroxide added to the polymer solution is preferably sufficient to hydrolyze approximately 20% to about 40% of the amide groups comprising the polymer. The preferred hydrolyzing agent is a 50% sodium hydroxide solution. Although more dilute sodium hydroxide solutions may be used which further dilute the polymer solution, they are generally not preferred due to the additional costs of transporting, storing and handling increased volumes of dilute solutions.

After adding dilution water and hydrolyzing agent, the solution is continuously fed into the post polymerization reactor 30 via inlet line 32 in a manner which minimizes its penetration into the fluid already in the reactor. As a result the extent of the hydrolysis reaction within the reactor varies continuously as a function of reactor location. When the hydrolysis reaction is complete, i.e., 20-40% hydrolysis, the partially hydrolyzed polymer solution is withdrawn from the outlet 33 of the reactor 30 at a rate of about 55 gallons per minute by a pump 34. The partially hydrolyzed polymer solution may be finally diluted to a desired concentration so that it is in a condition for use in a secondary or tertiary oil recovery process. The final dilution is more easily performed because of the intermediate dilution of the solution prior to hydrolysis and is preferably performed in close proximity to the injection wellhead.

EXAMPLE 1

In order to determine the quality of the polymer produced in the polymerization reactor 20 according to the present invention, polyacrylamide samples were taken at the reactor outlet 23. The solution was then diluted with synthetic brines to concentrations typically used in oil recovery applications. The results are tabulated in Table 1 below. Sample numbers indicate the volume or slug number. For example, Sample 2 represents material taken from the center of the second volume of partially polymerized solution introduced into the reactor. Sample ⅔ represents material taken from the interface of the second and third volumes.

TABLE 1

| Sample | 500 ppm Polymer 500 ppm NaCl | | 1,000 ppm Polymer 20,000 ppm NaCl | |
|---|---|---|---|---|
| | Viscosity (cp) | Screen Factor | Viscosity (cp) | Screen Factor |
| ½ | 32.6 | 25.2 | 10.5 | 27.9 |
| 2 | 32.8 | 28.9 | 11.3 | 33.1 |
| ⅔ | 32.6 | 30.4 | 11.9 | 34.6 |
| 3 | 37.3 | 32.7 | 12.9 | 36.3 |
| ¾ | 36.6 | 34.4 | 13.1 | 38.2 |
| 4 | 34.9 | 32.9 | 12.4 | 36.0 |

The data indicate that the process produces a high quality polymer.

EXAMPLE 2

An aqueous polyacrylamide solution, having a polymer concentration of 9 percent by weight, was prepared according to the process of the present invention in polymerization reactor 20. Dilution water was added to the polymer solution upstream of the static mixer. The amount of dilution water added was varied in each run. The results are tabulated in Table 2 below.

TABLE 2

| Run | Rates (gpm) | | Polymer Polymer + Water | Mixer Δ P (psi) |
|---|---|---|---|---|
| | Polymer Solution | Dilution Water | | |
| 1 | 4.86 | 0 | 1.00 | 100 |
| 2 | 11.30 | 4.07 | 0.74 | 82 |
| 3 | 12.30 | 4.02 | 0.75 | 81 |
| 4 | 8.30 | 4.46 | 0.65 | 74 |
| 5 | 7.60 | 4.36 | 0.64 | 65 |
| 6 | 4.97 | 4.39 | 0.53 | 56 |
| 7 | 4.50 | 0 | 1.00 | 95 |

Runs 2–6, wherein dilution water was added to the polymer solution prior to hydrolysis, showed substantial reduction in the static mixer pressure drop in comparison to runs 1 to 7, wherein no dilution water was added prior to hydrolysis. Each of the polymers in runs 2–6 was of acceptable quality for oil recovery processes with the exception of the polymer solution of run 6, which had some free water present. This indicates that the maximum amount of dilution water which can be added to this particular polymer solution is between the fractional values of 0.53 and 0.64.

While the method of the present invention is described and illustrated with relation to a specific use, the on-site preparation of partially hydrolyzed polyacrylamide solutions which are employed in the secondary and tertiary oil recovery, it is understood that such showing is presented by way of example and not by way of limitation. The method may be used to prepare polymer solutions for other applications.

I claim:

1. A process for the preparation of aqueous polymer solutions for use in secondary or tertiary recovery of oil from a subterranean oil-bearing formation comprising:
   forming a first volume of a first reaction mixture comprising a polymerizable substance and a polymerization initiator;
   introducing the first volume of the first reaction mixture into a first reaction vessel having an inlet and an outlet;
   repeating at regular predetermined intervals the formation of additional volumes of the first reaction mixture and sequentially introducing each additional volume into the first reaction vessel in a manner such that a substantially stable interface forms between each adjacent volume and substantially no mixing occurs between each volume;

controlling the rate of movement of each volume of the first reaction mixture in the first reaction vessel from the inlet to the outlet thereof in a manner such that, as each volume of the first reaction mixture is continuously moved through the reaction vessel, the extent of polymerization of the polymerizable substance in each volume differs from that of every other volume in the first reaction vessel and the polymerization of the polymerizable substance in each volume is essentially complete, forming a polymer solution, when each volume successively reaches the outlet of the first reaction vessel;

successively and continuously removing each volume of the polymer solution from the outlet of the first reaction vessel;

forming a second reaction mixture by continuously introducing a dilution water in an amount less than that which causes free water to substantially separate from the polymer solution and a modifying agent capable of reacting with the polymer in the solution into each volume of polymer solution;

continuously introducing the second reaction mixture into a second reaction vessel having an inlet and an outlet;

controlling the rate of movement of the second reaction mixture in the second reaction vessel from the inlet to the outlet thereof in a manner such that the reaction between the polymer and the modifying agent is essentially complete, forming a product solution, when the second reaction mixture reaches the outlet of the second reaction vessel;

continuously removing the product solution from the outlet of the second reaction vessel; and diluting the product solution prior to injecting it via a well into the subterranean oil-bearing formation.

2. The process of claim 1 further comprising controlling the rate of movement of the second reaction mixture in said second reaction vessel from the inlet to outlet thereof in a manner such that the extent of reaction between the polymer and the modifying agent increases from the inlet to the outlet of the second reaction vessel.

3. The process of claim 1 wherein the dilution water is added in an amount such that the fraction:

$$\frac{\text{polymer solution}}{\text{polymer solution} + \text{dilution water}}$$

is between about 0.5 and about 1.0.

4. The process of claim 3 wherein the fraction of claim 3 is between about 0.67 and about 1.0.

5. The process of claim 1 wherein the second reaction mixture is mixed in a mixing means prior to introducing the second reaction mixture to the second reaction vessel.

6. The process of claim 1 wherein the first reaction mixture is formed in a receiving vessel separate from said first reaction vessel and maintained therein until the reaction between the polymerizable substance and the polymerization initiator has been initiated.

7. The process of claim 1 wherein the polymerizable substance is an acrylamide monomer.

8. The process of claim 1 wherein the polymerizable substance is an acrylamide monomer and the modifying agent is an alkali metal hydroxide.

9. The process of claim 8 wherein the alkali metal hydroxide is introduced into an acrylamide polymer solution in an amount sufficient to hydrolyze from about 10% to about 50% of the amide groups comprising the acrylamide polymer.

10. The process of claim 1 wherein the product solution comprises a partially hydrolyzed polyacrylamide.

11. A process for the continuous preparation of aqueous polymer solutions for use in secondary or tertiary recovery of oil from subterranean oil-bearing formations comprising;

forming a first volume of a first reaction mixture comprising a polymerizable substance and a polymerization initiator;

introducing the first volume of the first reaction mixture into a first reaction vessel having an inlet and an outlet;

repeating at regular predetermined intervals the formation of additional volumes of the first reaction mixture and sequentially introducing each additional volume into the first reaction vessel in a manner such that a substantially stable interface forms between adjacent volume and substantially no mixing occurs between each volume;

controlling the rate of movement of each volume of the first reaction mixture in the first reaction vessel from the inlet to the outlet thereof in a manner such that, as each volume of the first reaction mixture is continuously moved through the reaction vessel, the extent of the polymerization of the polymerizable substance in each volume differs from that of every other volume in the first reaction vessel and the polymerization of the polymerizable substance in each volume is essentially complete, forming a polymer solution, when each volume successively reaches the outlet of the first reaction vessel;

successively and continuously removing each volume of the polymer solution from the outlet of the first reaction vessel;

introducing a modifying agent capable of reacting with the polymer in the solution into each volume of polymer solution;

continuously introducing the second reaction mixture into a second reaction vessel having an inlet and an outlet;

controlling the rate of movement of the second reaction mixture in the second reaction vessel from the inlet to the outlet thereof in a manner such that the reaction between the polymer and the modifying agent is essentially complete, forming a product solution, when the second reaction mixture reaches the outlet of the second reaction vessel;

continuously removing the product solution from the outlet of the second reaction vessel; and diluting the product solution prior to injecting it via a well into the subterranean oil-bearing formation.

12. The process of claim 11 further comprising controlling the rate of movement of the second reaction mixture in said second reaction vessel from the inlet to outlet thereof in a manner such that the extent of reaction between the polymer and the modifying agent increases from the inlet to the outlet of the second reaction vessel.

13. The process of claim 11 wherein the second reaction mixture is mixed in a mixing means prior to introducing the second reaction mixture to the second reaction vessel.

14. The process of claim 11 wherein the first reaction mixture is formed in a receiving vessel separate from said first reaction vessel and maintained therein until the reaction between the polymerizable substance and the polymerization initiator has been initiated.

15. The process of claim 11 wherein the polymerizable substance is an acrylamide monomer.

16. The process of claim 11 wherein the polymerizable substance is an acrylamide monomer and the modifying agent is an alkali metal hydroxide.

17. The process of claim 16 wherein the alkali metal hydroxide is introduced into an acrylamide polymer solution in an amount sufficient to hydrolyze from about 10% to about 50% of the amide groups comprising the acrylamide polymer.

18. The process of claim 11 wherein the product solution comprises a partially hydrolyzed polyacrylamide.

* * * * *